United States Patent [19]
Elliott

[11] Patent Number: 5,640,802
[45] Date of Patent: Jun. 24, 1997

[54] SUPPORT ASSEMBLY AND METHOD FOR GROWING TOMATO PLANTS AND THE LIKE

[76] Inventor: Olin S. Elliott, P.O. Box 8675, Greenville, S.C. 29604

[21] Appl. No.: 557,705

[22] Filed: Nov. 13, 1995

[51] Int. Cl.$^6$ .......................... A01G 17/06; A01G 17/14
[52] U.S. Cl. .................................. 47/45; 248/156
[58] Field of Search ....................... 248/159, 156, 248/530; 52/637; 47/45 C, 45 R, 47 R

[56] References Cited

U.S. PATENT DOCUMENTS

| | | | |
|---|---|---|---|
| 510,524 | 12/1893 | Smith | 47/45 C |
| 963,030 | 7/1910 | Balch | 47/45 C |
| 1,635,071 | 7/1927 | Comstock | 47/45 C |
| 2,763,096 | 9/1956 | Roger | 47/45 C |
| 3,245,188 | 4/1966 | Evans | 52/638 |
| 3,264,783 | 8/1966 | Bayliss | 47/45 C |
| 4,022,436 | 5/1977 | Thomas | 47/45 C |
| 4,044,523 | 8/1977 | Layher | 52/638 |
| 4,213,272 | 7/1980 | Nievelt | 47/45 C |
| 4,295,317 | 10/1981 | van Tielen | 52/637 |
| 4,402,166 | 9/1983 | Wortham | 248/156 |
| 4,894,951 | 1/1990 | Rigley | 47/45 C |
| 4,922,653 | 5/1990 | Stone | 47/45 C |
| 5,323,559 | 6/1994 | Allman | 47/45 C |

FOREIGN PATENT DOCUMENTS

| | | | |
|---|---|---|---|
| 763256 | 12/1936 | United Kingdom | 47/637 |
| 2232051 | 12/1990 | United Kingdom | 47/45 C |

*Primary Examiner*—Terry Lee Melius
*Assistant Examiner*—Joanne C. Downs
*Attorney, Agent, or Firm*—Ralph Bailey

[57] ABSTRACT

A support assembly for growing tomato plants allows ready access to the plant during the various stages of growth by utilizing interchangeable parts including post sections having a tapered member (A) on a bottom end and a tapered socket (B) on the other end for joining the sections to form continuous posts having vertically spaced seating locations (C), and horizontal supports (D) having sockets (E) which fit securely onto post sections and spaced vertically to form modules that may be stacked in vertical relation and thereby added progressively to meet the needs engendered by growth of the plant and to permit ready access to the plant.

23 Claims, 6 Drawing Sheets

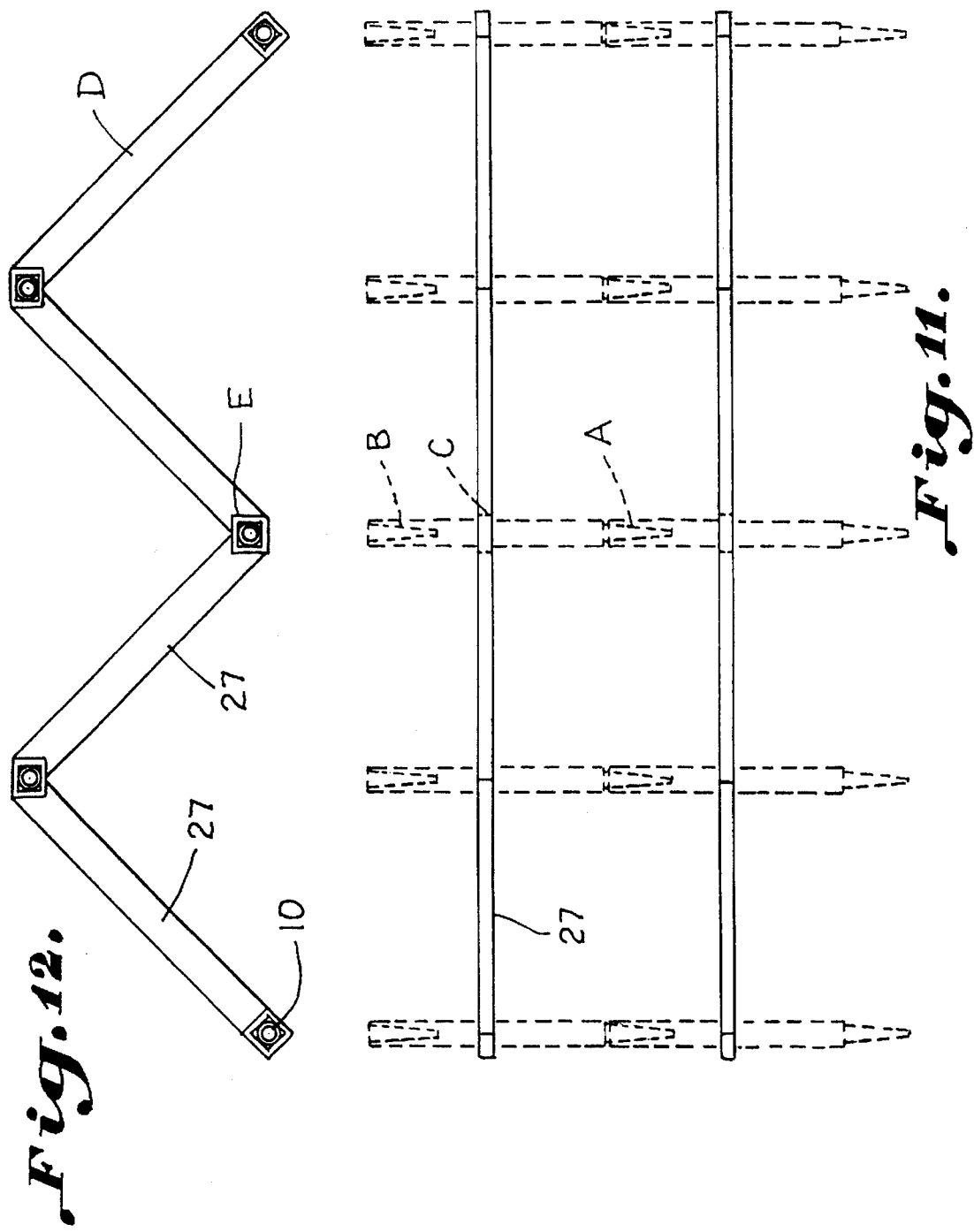

SUPPORT ASSEMBLY AND METHOD FOR GROWING TOMATO PLANTS AND THE LIKE

BACKGROUND OF THE INVENTION

This invention relates to a modular support assembly for growing tomato plants and the like wherein modules are added as the plant grows providing accessibility to the plant.

Growers of tomato plants, especially home grown plants, often utilize wooden stakes to tie up the plant as it grows and the fruit matures. Wooden stakes are difficult to obtain and depending upon the length and shape can be difficult to drive into the ground. The stakes can be the wrong height, may break if not strong enough and new ones are needed each year to prevent disease carry over. Physical limitations of the user such as size, age and the like are further impediments to the implementation of supports in general use.

Generally, prefabricated structures provided for supporting tomato plants have consisted of cylindrical wire cages staked into the ground. These cages do not allow ready accessibility to the plant because they are too tall or the openings are too small for the grower to gain effective access to the plants. Moreover, the wire cages are too bulky to be easily stored for use during the next growing season.

U.S. Pat. No. 5,179,799 discloses a tomato cage having three metal rods implanted into the ground, with a number of metal rings connecting the metal rods in a horizontal plane, and each ring having an increased diameter from bottom to top. U.S. Pat. No. 4,667,438 discloses a tomato cage having four support posts connected by vertically spaced horizontal rods. The structures illustrated in these patents are also such as to limit free access to the plants as they grow. U.S. Pat. No. 4,677,788 illustrates the use of a single vertical support carrying vertically spaced rings for supporting several plants spaced circumferentially thereabout but the support afforded each individual plant is limited because the support does not surround the plants.

SUMMARY OF THE INVENTION

Accordingly, it is an object of this invention to provide a plant support assembly having a structure that allows ready accessibility to the plant, and is capable of being added to as the plant grows, increasing the height of the assembly only as dictated by the size of the plant.

Another important object of this invention is to provide a plant support assembly that can be easily assembled and disassembled, which requires little space for storage, and is durable enough to be reused.

Another important object of the invention is to provide a plant support assembly that may be easily cleaned in its component parts and will not carry over fungus or disease from season to season.

Another important object of the invention is to use a series of interchangeable parts to build a plant support assembly so that multiple forms and configurations of support structures may be erected, including singular plant support assemblies, multiple plant support assemblies, complete plant enclosures, and partial plant enclosures.

Another important object of the invention is to provide a method of growing plants that includes building a support structure progressively to meet the increasing needs of the plant for support as well as fastening the fruit bearing branches to the support assembly.

Another important object of the invention is to provide a rigid, self-supporting framework of variable height that does not damage plants with sharp edges or angles.

It has been found that a modular plant support structure may be provided by utilizing standardized components including post sections having a tapered lower end, a mating socket on the upper end for receiving the tapered lower end of another post section, and an intermediate seat for receiving horizontal support members so that modules may be added as the plants grow.

The invention is thought to have its greatest usefulness in growing tomato plants and the invention has been described in this context, however, it is to be understood that the invention is useful in connection with any plants requiring support above the ground including many other fruit bearing plants such as cucumbers.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 11 is a modified form of the invention illustrated as including post segments with substantially W-shaped horizontal segments located as at various levels on the posts; and FIG. 12 is a further illustration of the apparatus shown in FIG. 11 illustrating horizontal support members.

DESCRIPTION OF A PREFERRED EMBODIMENTS

The drawings illustrate a molded plastic support assembly for aiding in growing tomato plants and the like. A plurality of horizontally spaced upright rigid post sections are provided, each post section having an inwardly and downwardly tapering member A at a bottom end and a tapered receiving socket B having a complimentary configuration at a top end so that the post sections may be assembled with a tapered lower member of a next succeeding post section received in the socket at the top end to form a continuous post. The post sections also have vertically spaced upright receiving members C for positioning a rigid horizontal support D attachable to the post sections for securement thereon forming a three dimensional module extending about tomato plants. Receptacles E are provided at spaced locations about the horizontal supports for reception upon the upright receiving members C. The modules are capable of being successively added in vertically spaced relation as the plant grows requiring additional vertical support. Thus, the method contemplates progressively assembling the modules to achieve added height as the plant grows and disassembling them for storage and reuse upon harvesting the fruit of the plant.

Figure 1:
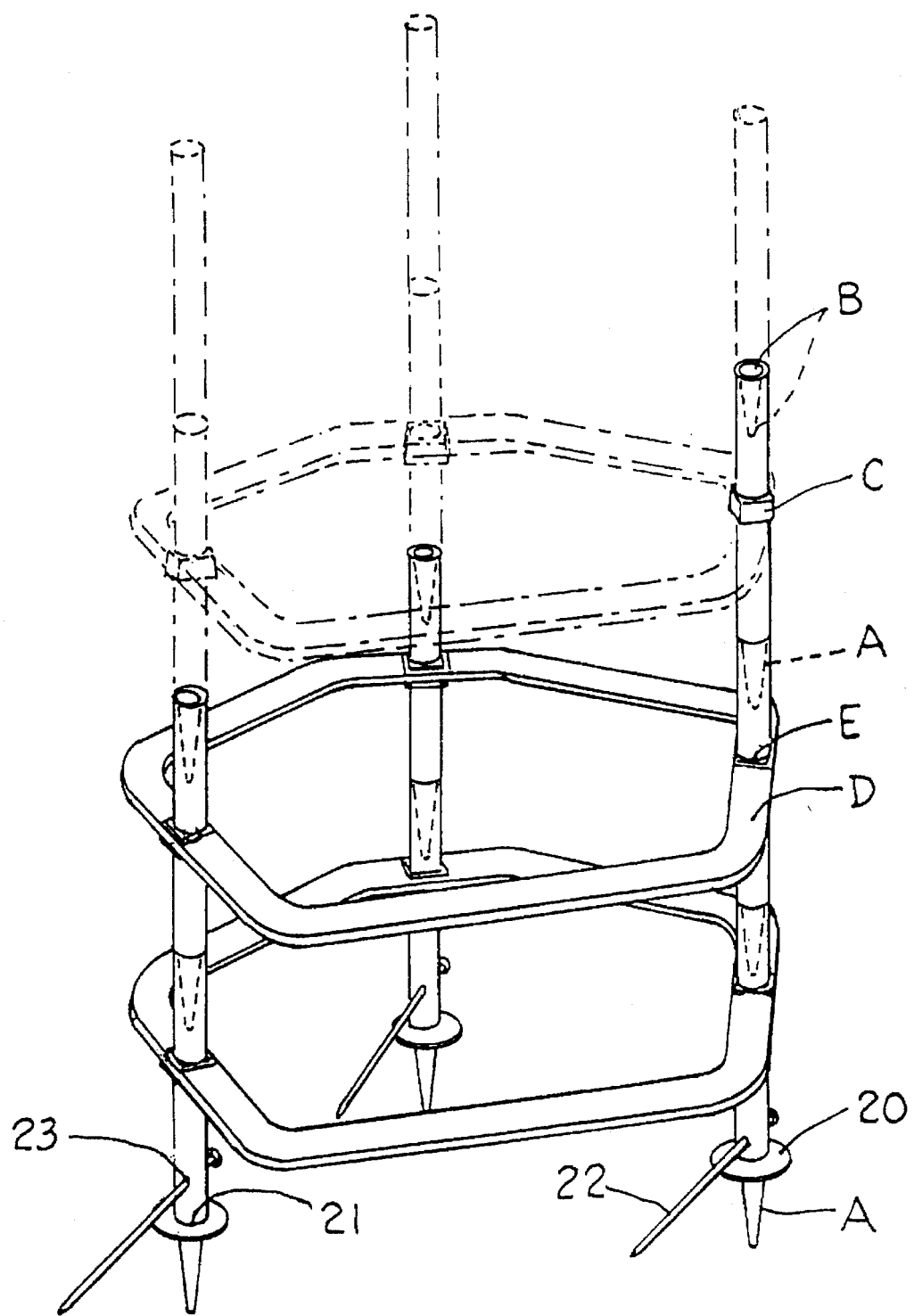
FIG. 1 is a perspective view illustrating a support assembly and method for growing tomato plants in accordance with the invention utilizing post sections and a rigid horizontal support joining post sections positioned circumferentially about a plant.
Figure 3:
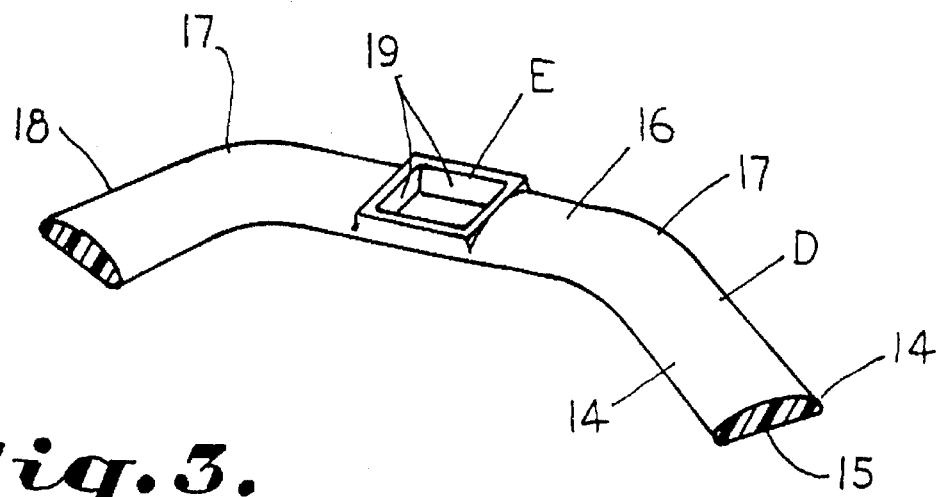
FIG. 3 is a perspective view with parts broken away illustrating a horizontal support section with a receptacle for reception upon the upright receiving members or receptacles carried intermediate the ends of the post sections.
Figure 2:
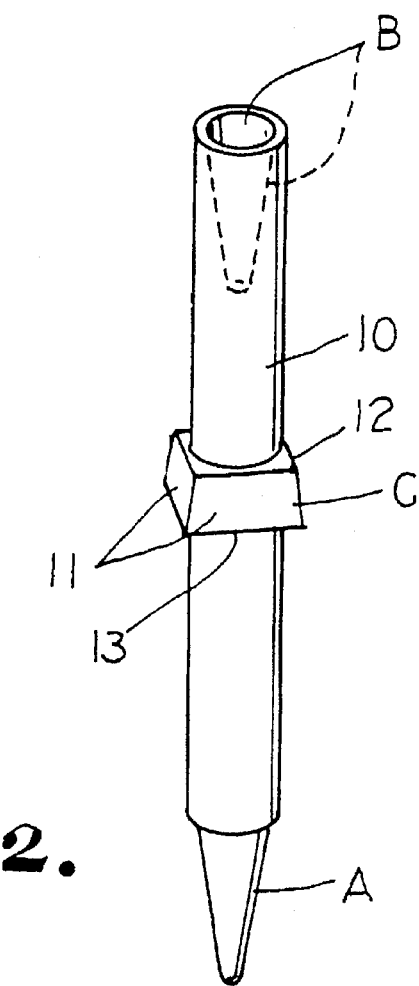
FIG. 2 is an enlarged perspective view further illustrating a post section having a tapered lower end, a receptacle at the top for receiving a tapered lower end of a next succeeding post section, added as the growth of the plant progresses, and a receptacle for receiving a horizontal support.

The post sections are best illustrated in FIGS. 1 and 2 as elongated sections 10 having a circular cross-section. The post sections 10 have tapered lower ends illustrated as at A and tapered receiving sockets B at the top for receiving a tapered lower end A of a next succeeding post section of the next module forming interlocking as illustrated in FIG. 1. Thus, the interlocking members successively join the post section preparatory to connecting said modules providing a means to connect said modules in stacked relation. Intermediate the ends of the post section and preferably centrally thereof spaced upright receiving members are located. The receiving members C have upwardly tapering flat sides 11 converging upwardly to form an upper shelf 12 opposite a larger lower shelf 13. Referring especially to FIG. 3, it will be noted that the rigid horizontal supports D have rounded edges 14 to avoid damage to the plant and are generally arcuate on the top with flat lower edges as at 15. Intermediate the short edges of the hexagonal horizontal supports and located on short sides 16 intermediate the curved members 17 connecting the long sides 18 are receptacles E having upwardly tapering sides 19, which are receivable closely adjacent the sides 11 of the upright receiving members C as in a pressed fit to avoid dislodgement as the plant grows with limbs and fruit attached to the horizontal supports.

Referring further to FIGS. 1-3, it will be noted that a closed, stable, generally three sided structure is created so as to extend entirely about a growing plant. The post sections 10 and horizontal support sections D may be formed with one circumferentially spaced set of post sections at a time to form modules extending about the plant, and these modules are added as the plant grows.

It will be further noted that base disk members, illustrated at 20, are provided and that these disk members have a central opening 21 for receiving lower tapered ends of the posts where the taper joins with the rod like intermediate sections of the post 10 for adding stability of the scaffold thus formed in the growth medium such as the outside earth or soil of a greenhouse and the like. If desired, a sharpened pin 22 may extend through an inclined opening just above the base disk members 20 as illustrated as at 23 to provide even greater stability of the base by extending into the growth medium.

Figure 4:
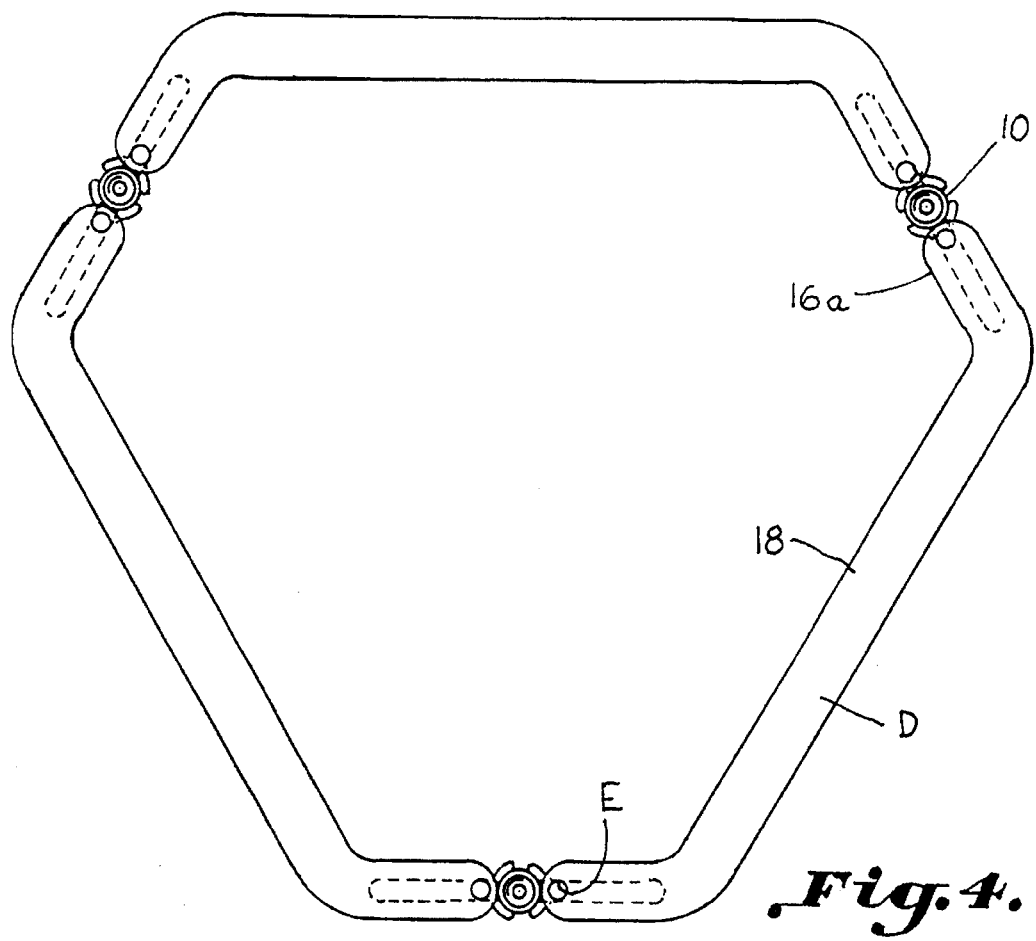
FIG. 4 is a top plan view illustrating a modified form of the invention wherein the hexagonal horizontal support members are formed from separate segments which are joined at their ends to post sections.
Figure 5:
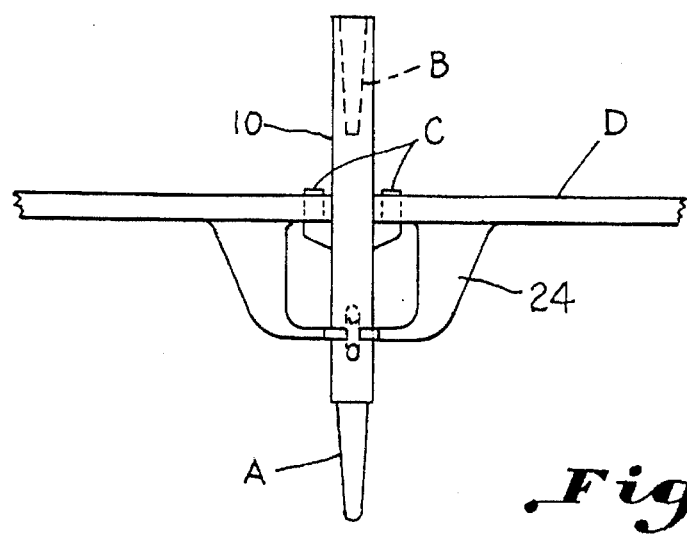
FIG. 5 is a side elevation illustrating a juncture between respective horizontal segments and post section illustrated in FIG. 4.

Referring more particularly to FIGS. 4 and 5, it will be noted that a horizontal support D is formed from a number of separate sections, each of which encompasses a long side 18 and segmented short sides as illustrated at 16a. The short sides 16a abut a post section 10 and have receptacles E for reception of spaced upright receiving members C in the form of pegs, which are offset from the main post section 10 and carried integrally therewith. If desired, downwardly extending bracket members 24 may be provided to brace the segments to avoid dislodgement as the plant grows. By thus segmenting the horizontal supports D, packaging and storage may be facilitated.

Figure 6:
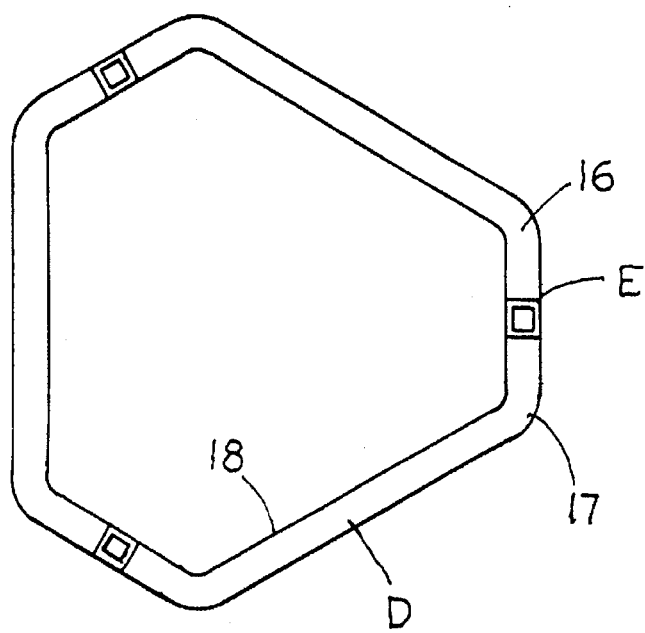
FIG. 6 is a top plan view further illustrating an integral hexagonal horizontal support member shown in FIGS. 1–3.
Figure 8:
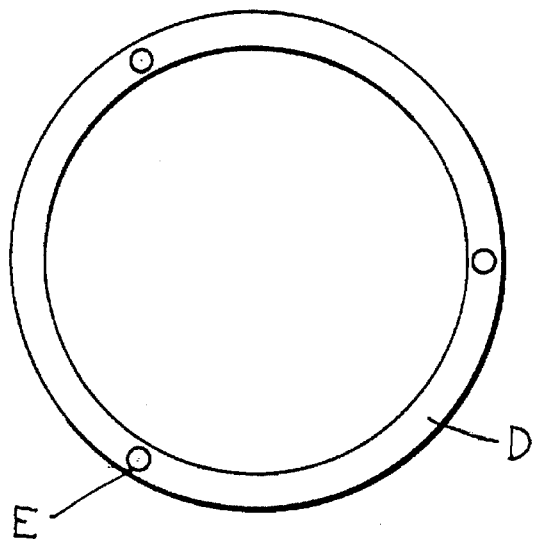
FIG. 8 is a plan view illustrating a horizontal support of circular configuration having post receiving receptacles.
Figure 7:
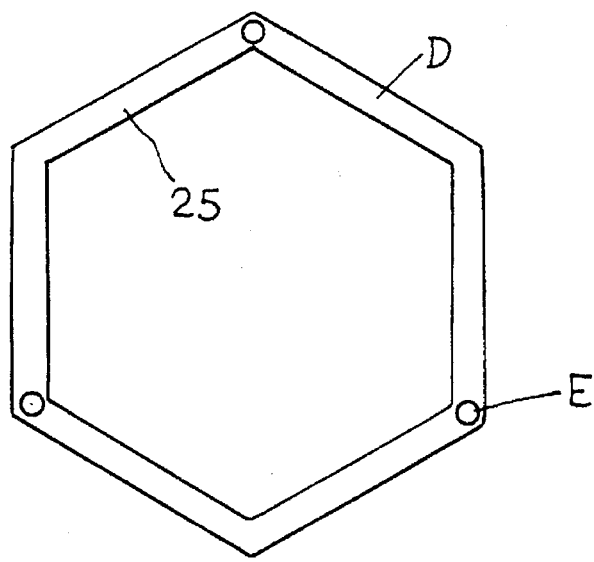
FIG. 7 is a modified form of the invention illustrating a hexagonal horizontal support member as having segments with equal sides.

FIG. 6 further illustrates the hexagonal horizontal support section D of the preferred embodiment illustrated in FIGS. 1–3. FIG. 7 illustrates a modified hexagonal horizontal support D having equal sides 25 having receptacles E at every other corner. FIG. 8 illustrates another modified horizontal support of circular configuration having spaced receptacles E.

Figure 10:
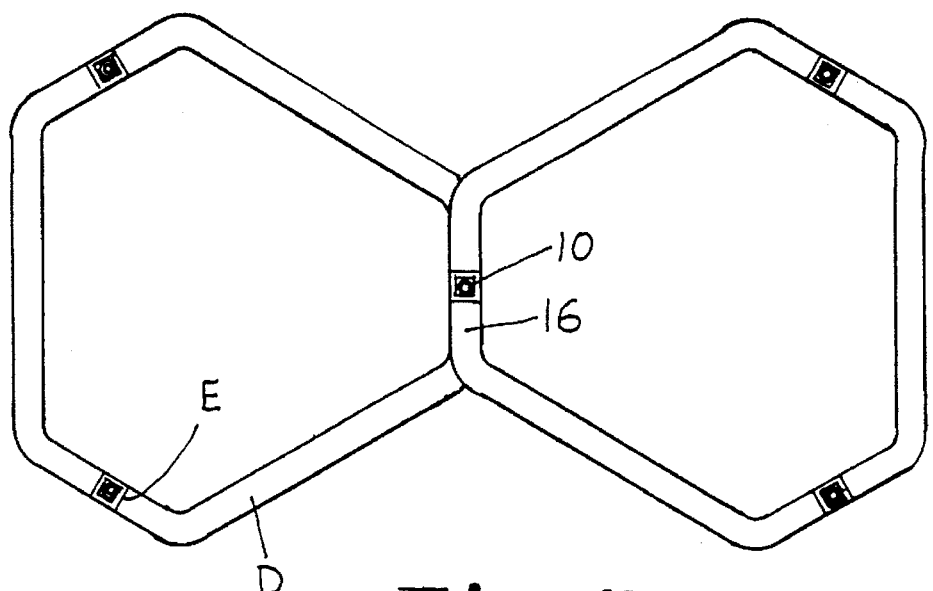
FIG. 10 is a top plan view of an apparatus illustrated in FIG. 9 wherein a series of hexagonal horizontal support members are joined at a short intermediate side.
Figure 9:
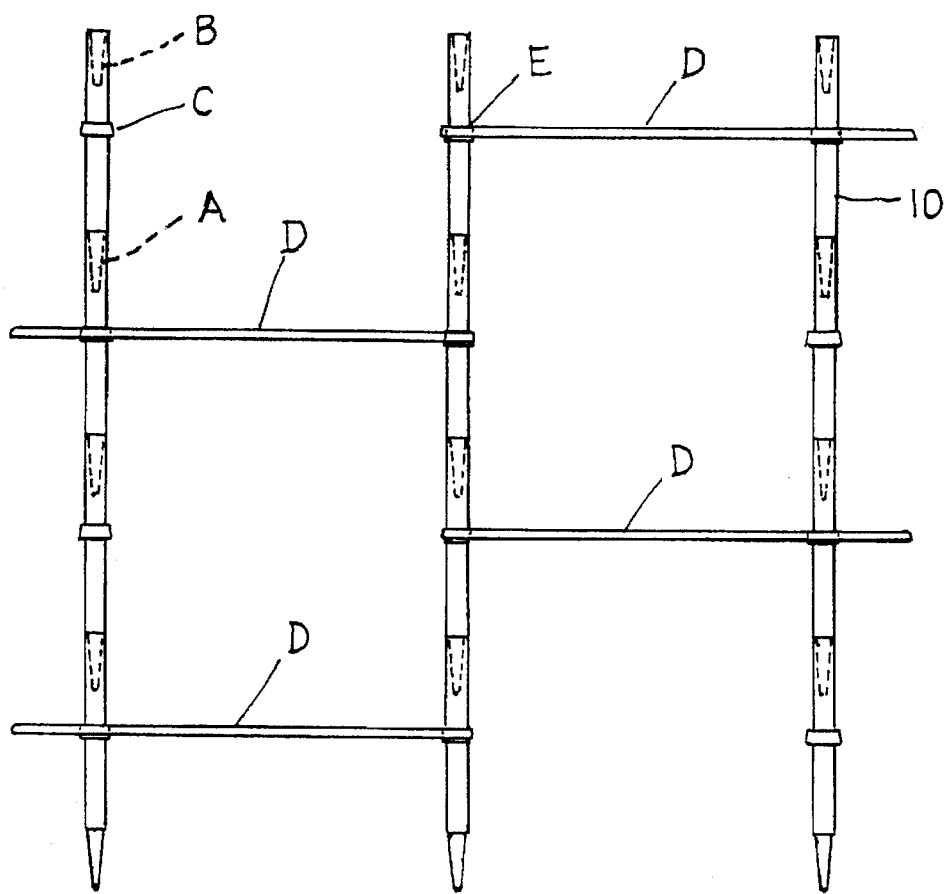
FIG. 9 is a side elevation a modified form of the invention wherein hexagonal support members are connected at alternating vertical spacings on post sections which are added in modules as the plants grow.

FIGS. 9 and 10 illustrate another modified form of the invention as a trellis wherein post sections 10 join the hexagonal integral horizontal supports at short sides 16 which are illustrated in FIG. 9 as being spaced vertically on the modules formed by respective post sections 10. Referring to FIGS. 11 and 12, a modified form of trellis includes generally W-shaped horizontal supports D which utilize post sections 10 at the ends and corners. The W-shaped horizontal supports D have equal sides illustrated at 27.

It is thus seen that a system by which plants such as tomatoes can be supported off of the ground with an easily assembled and disassembled support or scaffolding has been provided. This scaffold can be assembled by the gardener as the plant grows to accommodate the height and breadth of the plant. The scaffold components may be made from a green or other desirable color compatible material that will last from season to season, but be degradable upon disposal. Recyclable material may be a desirable alternative.

While a preferred embodiment of the invention has been described using specific terms, such description is for illustrative purposes only, and it is to be understood that changes and variations may be made without departing from the spirit or scope of the following claims.

What is claimed is:

1. A molded plastic support assembly for aiding in growing tomato plants and the like comprising:
    a plurality of modules capable of being successively added in superposed relation as a plant grows so as to require additional vertical support;
    said modules each including
        a plurality of horizontally spaced upright rigid post sections;
        interlocking members integral with each end of said post sections for successively joining said post sections preparatory to connecting said modules in stacked relation;
        an upright receiving member integral with each of said post sections projecting outwardly therefrom and being spaced from and between each of said interlocking members;
        a rigid horizontal support receivable upon said upright receiving members of a plurality of spaced post sections forming a module so as to be spaced intermediate the ends of said post sections between respective interlocking members; and
        a plurality of horizontal sides forming each rigid horizontal support;
    whereby modules may be progressively assembled to achieve added height as the plant grows and readily disassembled for reuse upon harvesting the fruits of the plant.

2. The structure set forth in claim 1 wherein said post sections when assembled form continuous posts.

3. The structure set forth in claim 1 wherein said interlocking members include a tapered portion on a lower end and a socket on an upper end of each post section so that said socket receives a tapered lower end of a next succeeding post section.

4. The structure set forth in claim 1 wherein each rigid horizontal support includes a plurality of integral sides disposed and joined at angles to one another.

5. The structure set forth in claim 4 wherein each horizontal support has spaced receptacles for reception upon said upright receiving members on said post sections.

6. The structure set forth in claim 5 wherein said upright receiving members taper upwardly and inwardly.

7. The structure set forth in claim 1 wherein each horizontal support includes a plurality of separable segments securable at each end to an upright receiving member of a post section.

8. The structure set forth in claim 1 wherein said modules are closed and extend entirely about said tomato plant.

9. The structure set forth in claim 1 wherein said upright receiving members are upwardly and inwardly tapered supports located intermediate the ends of each post section.

10. The structure set forth in claim 1 wherein said modules are assembled to form a chain of support assemblies for multiple plants by using common posts to support alternate vertically staggered horizontal supports;

whereby each common post may carry a series of horizontal supports for two separate plants.

11. The structure set forth in claim 1 wherein said horizontal supports are in the general shape of a W having angles of about 90° in a horizontal plane.

12. The structure set forth in claim 1 wherein each of said horizontal supports are substantially circular.

13. The structure set forth in claim 1 wherein said horizontal supports are hexagonal having sides of equal length.

14. The structure set forth in claim 1 wherein said horizontal supports are in the shape of a hexagon having alternating long and short sides.

15. The structure set forth in claim 1 including a plurality of base disks, each having a hole in the center receivable upon a bottom end of a post section for securement thereon bearing upon a growth medium to provide increased stability.

16. The structure set forth in claim 15 wherein said post sections have tapered bottom ends and an inclined passageway thereabove to receive a pin extending therethrough and into said growth medium.

17. A molded plastic support assembly for aiding in growing tomato plants and the like comprising:

a plurality of horizontally spaced upright rigid post sections, each post section having a tapered member at a bottom end and a tapered receiving socket at a top end so that said post sections may be assembled to form a continuous post;

an upright receiving member integral with each of said post sections projecting outwardly therefrom and being spaced intermediate the ends thereof;

a rigid horizontal support attachable to said post sections on said receiving members at vertically spaced locations for securement upon said posts forming an enclosed module about a tomato plant; and said modules being capable of being successively added in vertically spaced relation as said plant grows requiring additional vertical support;

whereby said modules may be progressively assembled to achieve added height as said plant grows and readily disassembled for reuse upon harvesting the fruits of said plant.

18. The structure set forth in claim 17 wherein said rigid horizontal supports are formed of integral segments extending about said tomato plant.

19. The method of growing tomato plants comprising the steps of:

planting a tomato plant in a growth medium;

positioning a plurality of spaced upright posts circumferentially about said tomato plant;

affixing a rigid horizontal support to said posts to form a support assembly about said tomato plant;

growing and observing the growth of said tomato plant;

fastening branches of said plant to said support assembly as necessary for support;

providing an upright receiving member integral with each of said post sections projecting outwardly therefrom and being spaced intermediate the ends thereof;

positioning additional horizontal supports on said receiving members progressively in vertically spaced relation upon said posts to achieve added height as said tomato plant grows;

whereby said tomato plant may be supported by said support assembly progressively assembled in response to the growth of said tomato plant allowing ready access thereto.

20. The method set forth in claim 19 including the step of anchoring said support assembly in said growth medium for positioning same around said tomato plant to provide added stability.

21. The method set forth in claim 19 including the step of positioning a net over said support assembly to protect said plant from animals and insects.

22. The method set forth in claim 19 including the step of disassembling said support assembly upon harvesting of said plant and storing support assembly components for reuse.

23. The method set forth in claim 19 including the step of providing separate post sections having interlocking members at either end forming modules with respective horizontal supports, said modules added as the plant grows.

* * * * *